United States Patent
Luo

(10) Patent No.: US 11,441,640 B2
(45) Date of Patent: Sep. 13, 2022

(54) BALANCED SPEED REDUCER OF DUAL-RING GEAR VARIABLE-LINE-SPEED PLANETARY ROW

(71) Applicant: Can Luo, Yunnan (CN)

(72) Inventor: Can Luo, Yunnan (CN)

(*) Notice: Subject to any disclaimer, the term of this patent is extended or adjusted under 35 U.S.C. 154(b) by 0 days.

(21) Appl. No.: 17/418,780

(22) PCT Filed: Dec. 27, 2019

(86) PCT No.: PCT/CN2019/129367
§ 371 (c)(1),
(2) Date: Jun. 26, 2021

(87) PCT Pub. No.: WO2020/140846
PCT Pub. Date: Jul. 9, 2020

(65) Prior Publication Data
US 2022/0056987 A1 Feb. 24, 2022

(30) Foreign Application Priority Data
Dec. 30, 2018 (CN) .......................... 201811649156.7

(51) Int. Cl.
*F16H 1/28* (2006.01)
(52) U.S. Cl.
CPC .......... *F16H 1/28* (2013.01); *F16H 2001/289* (2013.01)
(58) Field of Classification Search
CPC ...................................................... F16H 1/28
See application file for complete search history.

(56) References Cited

U.S. PATENT DOCUMENTS

| | | | | |
|---|---|---|---|---|
| 11,207,971 B2* | 12/2021 | Misu | ........................ | F16H 1/28 |
| 2008/0202832 A1* | 8/2008 | Ai | ........................ | F16H 1/2818 |
| | | | | 180/65.51 |

(Continued)

FOREIGN PATENT DOCUMENTS

| | | |
|---|---|---|
| CN | 203142374 U | 8/2013 |
| CN | 103335073 A | 10/2013 |

(Continued)

OTHER PUBLICATIONS

International Search Report (with English translation) and Written Opinion issued in PCT/CN2019/129367, dated Apr. 1, 2020.

*Primary Examiner* — Derek D Knight
(74) *Attorney, Agent, or Firm* — Hamre, Schumann, Mueller & Larson, P.C.

(57) ABSTRACT

A balanced speed reducer of a dual-ring gear variable-line-speed planetary row includes a dual-ring gear variable-line-speed planetary row, an input end (6), an output end (7), a locking end (8), and auxiliary devices such as bearings. The dual-ring gear planetary row includes a left ring gear (1), a right ring gear (2), and a planet carrier (3). A left planetary gear (4) and a right planetary gear (5) that are connected on each planetary gear shaft have the same rotation speed. The left planetary gear (4) meshes with the left ring gear (1), and the right planetary gear (5) meshes with the right ring gear (2). The number of gear sets is not less than two. A teeth number combination and a number of gear sets are set according to a range specifying parameter and following a principle of matching the teeth number combination with the number of gear sets. A rule for manufacturing and assembling planetary gears is executed. A regulation on gear reference circle radii is executed. By connecting the planetary carrier (3) to the input end (6), connecting one ring gear to the output end (7), and connecting the other ring gear to the locking end (8), a speed reducer that has a corre- (Continued)

sponding left transmission ratio and right transmission ratio, can be actually assembled and provides balanced operation is formed.

2 Claims, 2 Drawing Sheets

(56) References Cited

U.S. PATENT DOCUMENTS

| | | | |
|---|---|---|---|
| 2020/0217397 A1* | 7/2020 | Ho | F16H 1/28 |
| 2020/0309235 A1* | 10/2020 | Fujimoto | F16H 1/28 |
| 2021/0054909 A1* | 2/2021 | Luo | F16H 57/10 |
| 2021/0140515 A1* | 5/2021 | Isono | B60K 5/00 |

FOREIGN PATENT DOCUMENTS

| | | |
|---|---|---|
| CN | 107420499 A | 12/2017 |
| EP | 2526321 B1 | 7/2014 |
| WO | 2014077007 A1 | 5/2014 |

* cited by examiner

BALANCED SPEED REDUCER OF DUAL-RING GEAR VARIABLE-LINE-SPEED PLANETARY ROW

TECHNICAL FIELD

The present invention relates to the technical field of planetary row transmission equipment, and particularly to a speed reducer of a dual-ring gear variable-line-speed planetary row, which has a teeth number combination of gears matching the number of gear sets, can be actually assembled, and provides balanced operation.

BACKGROUND

An ordinary planetary gear is a general structure in the machinery industry. It has three components: sun gear, ring gear and planet carrier. There are multiple planetary gear shafts on the planet carrier, and each planetary gear shaft has only one gear, which is an ordinary planetary gear. Different from an ordinary planetary row, the dual-ring gear variable-line-speed planetary row of the present invention is composed of three parts: a left ring gear, a right ring gear and a planet carrier with planetary gears. There are no less than two planetary gear axes on the planet carrier, and a left planetary gear and a right planetary gear are arranged on each planetary gear axis in a left-to-right order. The dual-sun gear variable-line-speed planetary row is called "double-row outer meshing planetary gear train" according to the naming convention in the industry. According to this naming method, a dual-ring gear variable-line-speed planetary row should be called "double-row internal meshing planetary gear train". The "dual-ring gear variable-line-speed planetary row" is not considered as an independent planetary row in the industry. Such a planetary row is considered as a "Ferguson Paradox machine," which cannot be actually assembled and cannot be operated in a balanced manner. It is proposed by the inventor of the present invention that: by setting the number of gear sets to be not less than two, setting a range specifying parameter, following the principle of matching a teeth number combination with the number of gear sets, executing a rule for manufacturing and assembling planetary gears, executing a regulation on gear reference circle radii, connecting a planet carrier to an input end, connecting one ring gear to a locking end, and connecting another ring gear to an output end, the dual-ring gear variable-line-speed planetary row forms a speed reducer that can be actually assembled and provides balanced operation. When the number of gear sets is less than two, the operation of the planetary row is unbalanced, and large vibrations are generated during operation. When the teeth number combination does not meet the range specifying parameter, the speed reducer cannot be formed. For example, when the teeth number combination of the left ring gear, the right ring gear, the left planetary gear, and the right planetary gear is 60, 80, 18, 24, the teeth number combination makes the value of the range specifying parameter be equal to 1.0, which does not meet the regulation, resulting in that the dual-ring gear variable-line-speed planetary row cannot be geared down. When the teeth number combination does not match the number of gear sets, the dual-ring gear variable-line-speed planetary row cannot be actually assembled. For example, when the teeth number combination of the left ring gear, the right ring gear, the left planetary gear, and the right planetary gear is 57, 60, 20, 21, and the number of gear sets is 2, the teeth number combination does not match the number of gear sets, and consequently the dual-ring gear variable-line-speed planetary row cannot be actually assembled. Failing to meet the rule for manufacturing and assembling planetary gears and failing to meet the regulation on gear reference circle radii lead to a conclusion in the industry that the dual-ring gear variable-line-speed planetary row cannot be actually assembled. An object of the present invention is to utilize a dual-ring gear variable-line-speed planetary row, by setting the number of gear sets to be not less than two, setting a range specifying parameter, setting the teeth number combination and the number of gear sets following the principle of matching the teeth number combination with the number of gear sets, executing a rule for manufacturing and assembling planetary gears, executing a regulation on gear reference circle radii, and determining methods for connecting the three components with the input end, the output end, and the locking end, to form a speed reducer that can be actually assembled and provides balanced operation.

SUMMARY

A balanced speed reducer of a dual-ring gear variable-line-speed planetary row, includes a dual-ring gear variable-line-speed planetary row, an input end, an output end, a locking end, and auxiliary devices such as bearings.

The dual-ring gear variable-line-speed planetary row is composed of three parts: a left ring gear, a right ring gear and a planet carrier with planetary gears. The left ring gear and the right ring gear are located sequentially in a left-to-right order on an outer side. The ring gear is a torus having gears on the inner side, and the two ring gears have different reference circle radii. The planet carrier with planetary gears is located on an inner side, and the planetary gears are supported on the planet carrier by bearings on the planet carrier. The planetary gears are identical. The number of planetary gear axes supported by the planet carrier is the number K of gear sets. The three components have a common rotation axis called a revolution axis. The planetary gear axes are evenly arranged around the revolution axis, the planetary gear axes are all parallel to the revolution axis, and the planetary gear axes are at the same distance to the revolution axis, which distance is a reference center distance. On a gear axis of each planetary gear, two gears, namely, a left planetary gear and a right planetary gear, are arranged sequentially in a left-to-right order. The left planetary gear and the right planetary gear in each pair are connected respectively. The left planetary gear and the right planetary gear have the same rotation speed and different reference circle radii. The left planetary gear meshes with the left ring gear, the right planetary gear meshes with the right ring gear, the two ring gears are neither connected to nor meshes with each other. Bearings are disposed, so that the three components can rotate relative to each other, and each planetary gear can revolve about the revolution axis along with the planet carrier and can rotate about the planetary gear axis thereof; the three components cannot slide relative to each other along the revolution axis, and the planetary gears and the planet carrier cannot slide relative to each other along a direction parallel to the revolution axis. The left planetary gear and the right planetary gear have different reference circle line speeds, and the left ring gear and the right ring gear also have different reference circle line speeds. Because two reference circle line speeds exist in one planetary row, the planetary row is called "variable-line-speed planetary row". The planet carrier may support the planetary gears in two manners. In a first manner, the planetary gear is a shaft and the planet carrier is a bearing, as shown in FIG. 1 and FIG. 3. In a second manner, the planetary gear is a bearing and the planet carrier is a shaft, as shown in FIG. 2 and FIG. 4. The two manners for the planet carrier to support the planetary gears have the same operating effects, and provided that all other structures remain unchanged, can achieve exactly the same transmission ratio of the speed reducer. The term "teeth number combination" is each set of a number of teeth of the left ring gear, a number of teeth of the right ring gear, a number of teeth of the left planetary gear, and a number of teeth of the right planetary gear. "The number of teeth of the right ring gear*the number of teeth of the left planetary gear/(the number of teeth of the left ring gear*the number of teeth of the right planetary gear)" is a range specifying parameter of the present invention.

For the range specifying parameter, each teeth number combination must make a value of the range specifying parameter be greater than 0.875, less than 1.142857, and not equal to 1.0.

The number K of gear sets of the dual-ring gear variable-line-speed planetary row is an integer not less than two, and when the teeth number combination and the number of gear sets are set, a principle of matching the teeth number combination with the number of gear sets is: when an absolute value of a difference between the number of teeth of the left ring gear and the number of teeth of the right ring gear is a multiple of 2, setting the number of gear sets to 2; when an absolute value of a difference between the number of teeth of the left ring gear and the number of teeth of the right ring gear is a multiple of 3, setting the number of gear sets to 3; when an absolute value of a difference between the number of teeth of the left ring gear and the number of teeth of the right ring gear is a multiple of 4, setting the number of gear sets to 4 or 2; when an absolute value of a difference between the number of teeth of the left ring gear and the number of teeth of the right ring gear is a multiple of 5, setting the number of gear sets to 5; when an absolute value of a difference between the number of teeth of the left ring gear and the number of teeth of the right ring gear is a multiple of 6, setting the number of gear sets to 6, 3 or 2; when an absolute value of a difference between the number of teeth of the left ring gear and the number of teeth of the right ring gear is a multiple of 8, setting the number of gear sets to 8, 4 or 2; when an absolute value of a difference between the number of teeth of the left ring gear and the number of teeth of the right ring gear is a multiple of 10, setting the number of gear sets to 5 or 2. The number of gear sets cannot be too large so as to avoid collisions between neighboring planetary gears.

In the dual-ring gear planetary row, a section is set perpendicular to the revolution axis, which is tangent to each left planetary gear, and is called a left section. At a certain distance, another section is set perpendicular to the revolution axis, which is tangent to each right planetary gear, and is called a right section. In the left and right sections, on a sectional edge curve of teeth of the planetary gear, a part from the midpoint of the tooth root to the midpoint of the next tooth root is called a complete tooth. Regardless of whether the shape of the sectional edge curve of teeth is similar to a sinusoid, the phase angle value at the midpoint of the tooth root is 0, the phase angle value at the midpoint of the tooth tip of this tooth is $\pi$, and the phase angle value at the midpoint of the next tooth root is $2\pi$; by analogy, taking a graduated arc as an abscissa axis, each point on the sectional edge curve of teeth has a corresponding abscissa value, that is, a phase angle value. Such a method of assigning a phase angle value to each point on the sectional edge curve of teeth is commonly used in the motor industry, and should be understandable and acceptable in the machinery industry, see FIG. 6. The midpoint of the next tooth root is the point where the phase angle value of the current tooth is $2\pi$, is also the point where the phase angle value of the adjacent previous tooth is $4\pi$, and is also the point where the phase angle value of the adjacent next tooth is 0. One each planetary gear of the dual-ring gear variable-line-speed planetary row, radial sections are set, which are tangent to the left and right sections at the same time. There must be a radial section on which the phase angle values of teeth of the left planetary gear and the phase angle values of teeth of the right planetary gear are equal. This radial section is an equiphase surface. An intersection point between the equiphase surface and the sectional edge curve of teeth on the left section is a left equiphase point. An intersection point between the equiphase surface and the sectional edge curve of teeth on the right section is a right equiphase point. The phase angle values of the left equiphase point and the right equiphase point are an equiphase angle value a, and a has a value range of 0 to $2\pi$. Each planetary gear of the present invention has at least one equiphase surface. When the number of teeth of the left planetary gear is equal to the number of teeth of the right planetary gear, the planetary gear has an infinite number of equiphase surfaces. In the dual-ring gear variable-line-speed planetary row, a number K of gear sets is set. In a clockwise direction, the plane where the axis of the first planetary gear and the revolution axis lie is a first mounting surface, the plane where the axis of the second planetary gear and the revolution axis lie is a second mounting surface, the plane where the axis of the third planetary gear and the revolution axis lie is a third mounting surface, a fourth mounting surface, a fifth mounting surface, a sixth mounting surface, and a seventh mounting surface and so on are determined by analogy, and the plane where the axis of the $K^{th}$ planetary gear and the revolution axis lie is a $K^{th}$ mounting surface. An angle between neighboring mounting surfaces is (360 degrees/K). The number of teeth of the left ring gear is divided by the number K of gear sets to obtain a remainder, wherein a value of the remainder ranges from 0 to (K−1) and is an integer. A difference between the equiphase angle values of neighboring planetary gears is ($2\pi$*remainder value/K).

A rule for manufacturing and assembling planetary gears is: during manufacturing of planetary gears, selecting an equiphase surface on a first planetary gear so that the equiphase angle value is a, where a is generally 0; selecting an equiphase surface on a second planetary gear so that the equiphase angle value is (a+1*$2\pi$*remainder value/K); selecting an equiphase surface on a third planetary gear so that the equiphase angle value is (a+2*$2\pi$*remainder value/K); sequentially manufacturing a fourth planetary gear, a fifth planetary gear, a sixth planetary gear, a seventh planetary gear and so on by analogy, and selecting an equiphase surface on a $K^{th}$ planetary gear so that the equiphase angle value is (a+(K−1)*$2\pi$*remainder value/K). During assembly of planetary gears, the two ring gears and the planet carrier are assembled in place on the revolution axis, each mounting surface is calibrated, the equiphase surface of the first planetary gear with the equiphase angle value being a is caused to coincide with a first mounting surface, left and right equiphase points are caused to be outside the reference center distance, the first planetary gear is assembled; the equiphase surface of the second planetary gear with the equiphase angle value being (a+1*2*remainder value/K) is caused to coincide with a second mounting surface, left and right equiphase points are caused to be outside the reference center distance, the second planetary gear is assembled; the equiphase surface of the third planetary gear with the equiphase angle value being $(a+2*2\pi t*\text{remainder value}/K)$ is caused to coincide with a third mounting surface, left and right equiphase points are caused to be outside the reference center distance, the third planetary gear is assembled; the fourth planetary gear, the fifth planetary gear, the sixth planetary gear, the seventh planetary gear and so on are assembled sequentially by analogy, the equiphase surface of the $K^{th}$ planetary gear with the equiphase angle value being $(a+(K-1)*2\pi*\text{remainder value}/K)$ is caused to coincide with a $K^{th}$ mounting surface, left and right equiphase points are caused to be outside the reference center distance, and the $K^{th}$ planetary gear is assembled.

A regulation on gear reference circle radii is: setting a reference circle radius of the left ring gear and a reference circle radius of the left planetary gear, so that the number of teeth of the left ring gear/the number of teeth of the left planetary gear=the reference circle radius of the left ring gear/the reference circle radius of the left planetary gear, and that the reference circle radius of the left ring gear=the reference circle radius of the left planetary gear+the reference center distance; and setting a reference circle radius of the right ring gear and a reference circle radius of the right planetary gear, so that the number of teeth of the right ring gear/the number of teeth of the right planetary gear=the reference circle radius of the right ring gear/the reference circle radius of the right planetary gear, and that the reference circle radius of the right ring gear=the reference circle radius of the right planetary gear+the reference center distance. The left ring gear, each left planetary gear, the right ring gear, and each right planetary gear shall all satisfy this regulation. According to common practice in the industry, the reference center distance and the reference circle radii of gears are allowed to have a deviation range in practice.

There are two connection methods for connecting the three components of the dual-ring gear variable-line-speed planetary row with the input end, the output end, and the locking end, and speed reducers formed by the connection methods have different transmission ratios. In a first connection method, the planet carrier is connected to the input end, the left ring gear is connected to the output end, the right ring gear is connected to the locking end, and taking a transmission ratio of transmission from the planet carrier to the left ring gear as a left transmission ratio, the left transmission ratio=1/(1−the number of teeth of the right ring gear*the number of teeth of the left planetary gear/(the number of teeth of the left ring gear*the number of teeth of the right planetary gear)). In a second connection method, the planet carrier is connected to the input end, the right ring gear is connected to the output end, the left ring gear is connected to the locking end, and taking a transmission ratio of transmission from the planet carrier to the right ring gear as a right transmission ratio, the right transmission ratio=1/(1−the number of teeth of the left ring gear*the number of teeth of the right planetary gear/(the number of teeth of the right ring gear*the number of teeth of the left planetary gear)). It can be obtained by derivation that, the right transmission ratio=negative value of the left transmission ratio+1.0. For the first connection method, see FIG. 1 and FIG. 2. For the second connection method, see FIG. 3 and FIG. 4. When the value of the transmission ratio is positive, the direction of the rotation speed at the input end is the same as that at the output end; when the value of the transmission ratio is negative, the direction of the rotation speed at the input end is opposite to that at the output end. The input end is connected with a power apparatus to input power. The output end is connected with a power consumption apparatus to output power. The locking end is connected with devices with a zero speed such as a reducer housing, and the rotation speed of the locking end is zero. By keeping the connection at the locking end unchanged and exchanging the parts connected to the input end with the parts connected to the output end, the speed reducer is changed into an accelerator. The transmission ratio of the accelerator is the inverse of the transmission ratio of the corresponding speed reducer. The connection is to connect two objects through a mechanical connection means, so that the rotation speeds of the two objects are exactly the same. "*" is the multiplication sign, "/" is the division sign, "=" is the equal sign, "−" is the subtraction sign, "+" is the addition sign, and "π" is the pi symbol indicating the phase angle.

The number of gear sets is required to be not less than two, in order to ensure balanced operation of the speed reducer of the present invention. The principle of matching the teeth number combination with the number of gear sets in the dual-ring gear variable-line-speed planetary row has not been proposed in the industry, and is proposed for the first time in the present invention. The range specifying parameter is a requirement in the present invention. Only conditions of assembling planetary gears in an ordinary planetary row have been proposed in the industry, which are completely different from the "rule for manufacturing and assembling planetary gears" described in the present invention, both in form and content. The present invention proposes for the first time the rule for manufacturing and assembling planetary gears for the dual-ring gear variable-line-speed planetary row. Only a method of setting reference circle radii of a pair of two ordinary gears around the reference center distance has been proposed in the industry; the present invention proposes for the first time a method of setting reference circle radii of two pairs of, i.e., four gears, including the left ring gear, the left planetary gear, the right ring gear and the right planetary gear at the same time around the same reference center distance, that is, the regulation on gear reference circle radii.

The auxiliary devices such as the bearings adopt mature technologies in the machinery industry, and the supporting function of the bearing needs to meet the requirements of the present invention. The gears of the present invention include cylindrical gears, arc gears, spur gears, helical gears and other gear forms. The core performance of the reducer is the transmission ratio and balanced operation. The core performance of the dual-ring gear variable-line-speed planetary row is practical assemblability. In the present invention, the transmission ratio and balanced operation are determined by the teeth number combination, the number of gear sets, the connection method, and the practical assemblability is determined by the rule for manufacturing and assembling planetary gears and the regulation on the reference circle radii of the gears. The material of each component and device of the speed reducer, specific parameters such as the specific length of the reference center distance of the speed reducer and the height and width variations of the gear teeth, and the assembly and auxiliary lubrication materials depend on the actual requirements such as mechanical properties and durability and can be solved using general knowledge in the industry. Because they are not related to the transmission ratio and the practical assemblability, details will not be described in this specification.

The benefits of the present invention lie in the use of the dual-ring gear variable-line-speed planetary row. The present invention proposes the requirement of the number of gear sets to be not less than two, the range specifying parameter, the principle of matching the teeth number combination with the number of gear sets, the rule for manufacturing and assembling planetary gears, and the regulation on gear reference circle radii; and proposes that by connecting the planet carrier to the input end, connecting one ring gear to the locking end, and connecting the other ring gear to the output end, a speed reducer that can be actually assembled and provides balanced operation is formed. Existing speed reducers mainly include gear reducers, ordinary planetary row reducers, harmonic reducers, and cycloidal pin gear reducers. Gear reducers and ordinary planetary row reducers, which have a small transmission ratio, need to be connected in series at multiple stages for reduction in order to obtain a large transmission ratio, which leads to high complexity. Harmonic reducers and cycloidal pin gear reducers have a large transmission ratio, but their structures are complex and costly, and are not suitable for transmitting high power. For the speed reducer of the present invention, only a small number of levels of meshing gears are involved in the transmission from the input end to the output end, bringing the advantages of small loss, simple structure, low costs, high transmission efficiency, and large transmission ratio span, so that the present invention is both suitable for transmitting low power and suitable for transmitting high power, and can replace existing speed reducers.

BRIEF DESCRIPTION OF THE DRAWINGS

In FIG. 1 to FIG. 5: 1 is the left ring gear, 2 is the right ring gear, 3 is the planet carrier, 4 is the left planetary gear, 5 is the right planetary gear, 6 is the input end, 7 is the output end, and 8 is the locking end.

In FIG. 1 to FIG. 5, each planetary row is shown as a half schematic diagram according to common practice in the industry, which only shows the connection and structural relationship between components, and does not reflect the actual sizes. Auxiliary devices such as bearings, supports, and housings are omitted and not shown. An input arrow is used to represent the input end. An output arrow is used to represent the output end. A grounding symbol is used to represent the locking end of which the rotation speed is zero.

DETAILED DESCRIPTION

Figure 5:
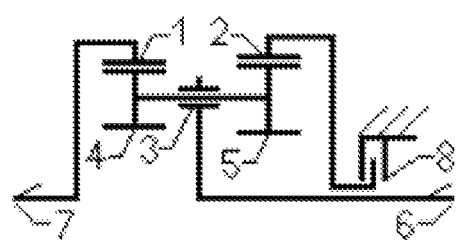
FIG. 5 is a schematic structural diagram of a balanced speed reducer of a dual-ring gear variable-line-speed planetary row according to Embodiment 1 of the present invention, where 8 is the locking end that forms a variable connection with the right ring gear, and is denoted by a symbol of a disc brake with a brake caliper being grounded.
Figure 6:
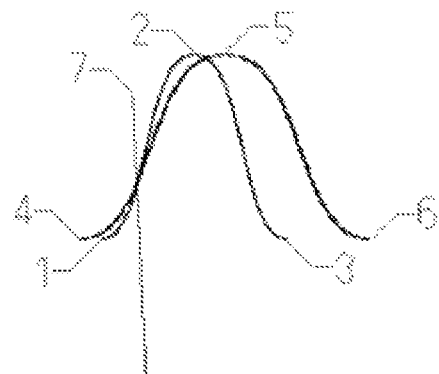
FIG. 6 is a schematic diagram of an equiphase surface intersecting with the left and right sections of planetary gears, where 1 is the midpoint of this tooth root of the left gear, 2 is the midpoint of the tooth tip of the left gear, 3 is the midpoint of the next tooth root of the left gear, 4 is the midpoint of this tooth root of the right gear, 5 is the midpoint of the tooth tip of the right gear, 6 is the midpoint of the next tooth root of the right gear, and 7 is a radial section, i.e., the equiphase surface.

Embodiment 1: A balanced speed reducer of a dual-ring gear variable-line-speed planetary row, includes a dual-ring gear variable-line-speed planetary row, an input end 6, an output end 7, a locking end 8, and auxiliary devices such as bearings. In FIG. 5, the auxiliary devices such as the bearings are not shown, and the locking end is shown as a disc brake with a brake caliper being grounded.

The dual-ring gear variable-line-speed planetary row is composed of three parts: a left ring gear 1, a right ring gear 2 and a planet carrier 3 with planetary gears. The left ring gear 1 and the right ring gear 2 are located sequentially in a left-to-right order on an outer side, and the two ring gears have different reference circle radii. The planet carrier 3 with planetary gears is located on an inner side, the planet carrier 3 is configured to support the planetary gears, and the planetary gears are identical. The three components have a common rotation axis called a revolution axis. The planetary gear axes are evenly arranged around the revolution axis, the planetary gear axes are all parallel to the revolution axis, and the planetary gear axes are at the same distance to the revolution axis, which distance is a reference center distance. On a gear axis of each planetary gear, two gears, namely, a left planetary gear 4 and a right planetary gear 5, are arranged sequentially in a left-to-right order. The left planetary gear 4 and the right planetary gear 5 in each pair are connected respectively. The left planetary gear 4 and the right planetary gear 5 have the same rotation speed and different reference circle radii. The left planetary gear 4 meshes with the left ring gear 1, and the right planetary gear 5 meshes with the right ring gear 2. The two ring gears are neither connected to nor meshes with each other. Bearings are disposed, so that the three components can rotate relative to each other, and each planetary gear can revolve about the revolution axis along with the planet carrier 3 and can rotate about the planetary gear axis thereof; the three components cannot slide relative to each other along the revolution axis, and the planetary gears and the planet carrier 3 cannot slide relative to each other along a direction parallel to the revolution axis. The planet carrier 3 may support the planetary gears in two manners. In this embodiment, a first manner is used, where the planetary gear is a shaft and the planet carrier 3 is a bearing, The teeth number combination in this embodiment makes the value of the range specifying parameter be 84/85, which is approximately equal to 0.9882352941. The requirement of the range specifying parameter is met.

The teeth number combination in this embodiment is as follows: the number of teeth of the left ring gear is 68, the number of teeth of the right ring gear is 64, the number of teeth of the left planetary gear is 21, and the number of teeth of the right planetary gear is 20; and the number K of gear sets is set to 4, which meets the principle of matching the teeth number combination with the number of gear sets. The number of gear sets is not large, and will avoid collisions between neighboring planetary gears.

In this embodiment, a rule for manufacturing and assembling planetary gears is executed. In this embodiment, the remainder value is 0. During manufacturing of planetary gears, an equiphase surface is selected on a first planetary gear so that the equiphase angle value is 0; an equiphase surface is selected on a second planetary gear so that the equiphase angle value is 0, an equiphase surface is selected on a third planetary gear so that the equiphase angle value is 0; an equiphase surface is selected on a fourth planetary gear so that the equiphase angle value is 0. During assembly of planetary gears, the two ring gears and the planet carrier 3 are assembled in place on the revolution axis, each mounting surface is calibrated, the equiphase surface of the first planetary gear with the equiphase angle value being 0 is caused to coincide with a first mounting surface, left and right equiphase points are caused to be outside the reference center distance, the first planetary gear is assembled; the equiphase surface of the second planetary gear with the equiphase angle value being 0 is caused to coincide with a second mounting surface, left and right equiphase points are caused to be outside the reference center distance, the second planetary gear is assembled; the equiphase surface of the third planetary gear with the equiphase angle value being 0 is caused to coincide with a third mounting surface, left and right equiphase points are caused to be outside the reference center distance, the third planetary gear is assembled; the equiphase surface of the fourth planetary gear with the equiphase angle value being 0 is caused to coincide with a fourth mounting surface, left and right equiphase points are caused to be outside the reference center distance, and the fourth planetary gear is assembled.

Assuming that the reference center distance in this embodiment is 160 mm, the reference circle radius of the left ring gear is 231.4893617 mm, the reference circle radius of the left planetary gear is 71.4893617 mm, the reference circle radius of the right ring gear is 232.7272727 mm, and the reference circle radius of the right planetary gear is 72.7272727 mm. This meets the regulation on gear reference circle radii.

In this embodiment, the speed reducer is formed by the first connection method, where the planetary carrier 3 is connected to the input end 6, the left ring gear 1 is connected to the output end 7, the right ring gear 2 is connected to the locking end 8, and taking a transmission ratio of transmission from the planet carrier 3 to the left ring gear 1 as a left transmission ratio, the left transmission ratio=1/(1−the number of teeth of the right ring gear*the number of teeth of the left planetary gear/(the number of teeth of the left ring gear*the number of teeth of the right planetary gear))=85. The input end 6 is connected with a power apparatus, which is a motor, to input power. The output end 7 is connected with a power consumption apparatus, which is a main rotor, to output power. The right ring gear 2 is connected to the locking end 8 by a mechanical connection means which is a disc brake. This connection is not a non-variable connection, but is a variable connection. The disc brake is a mature product in the industry. The brake disc is connected to the right ring gear 2, and the brake caliper is connected to the locking end 8. When the brake caliper clamps the brake disc, the rotation speed of the right ring gear 2 is zero, and the power inputted to the input end 6 is completely transmitted to the output end 7. When the brake caliper releases the brake disc, the right ring gear 2 is free. When the right ring gear 2 is free, the resistance is extremely small. As long as the output end 7 experiences a certain resistance, the power inputted to the input end 6 is transmitted to the right ring gear 2 to make it idle, and the output end 7 cannot obtain power. Therefore, the speed reducer of this embodiment can be used for transmission of the main rotor of a helicopter, and because a variable connection is provided between the right ring gear 2 and the locking end 8, it is a speed reducer with a clutch function. The auxiliary devices such as the bearings adopt mature technologies in the machinery industry, and the supporting function of the bearing needs to meet the requirements of this embodiment.

During operation of the speed reducer in this embodiment, the movement relationship is that the rotation direction of the planet carrier 3 is the same as the rotation direction of the left ring gear 1.

The total transmission ratio of the main rotor of a helicopter is about 80 to 100. The existing main rotor transmission generally needs to use multiple stages for reduction in series including a two-stage planetary row main speed reducer in combination with a bevel gear reducer, in order to achieve such a large total transmission ratio. For the main speed reducer, four levels of meshing gears are involved in the transmission from the input end to the output end, giving rise to the problems of great loss, complex structure, high costs, and low transmission efficiency. The main rotor transmission also requires a separate clutch. For the speed reducer of this embodiment, only two levels of meshing gears are involved in the transmission from the input end to the output end, bringing the advantages of small loss, simple structure, low costs, high transmission efficiency, and dispensing with the need of a separate clutch. Therefore, the speed reducer of this embodiment can be used for transmission of the main rotor of a helicopter in place of existing speed reducers.

Figure 1:
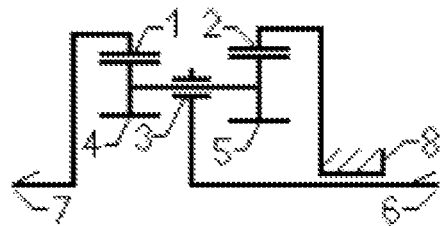
FIG. 1 is a schematic structural diagram of a balanced speed reducer of a dual-ring gear variable-line-speed planetary row of the present invention in which the left ring gear is connected to the output end and the planet carrier is a bearing.

Embodiment 2: A balanced speed reducer of a dual-ring gear variable-line-speed planetary row includes a dual-ring gear variable-line-speed planetary row, an input end 6, an output end 7, a locking end 8, and auxiliary devices such as bearings. In FIG. 1, the auxiliary devices such as the bearings are not shown.

Figure 2:
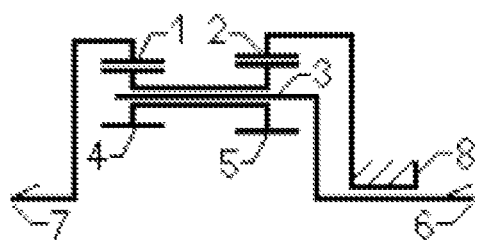
FIG. 2 is a schematic structural diagram of a balanced speed reducer of a dual-ring gear variable-line-speed planetary row of the present invention in which the left ring gear is connected to the output end and the planet carrier is a shaft.

The composition and structure of the dual-ring gear variable-line-speed planetary row are the same as those in Embodiment 1. The planet carrier 3 may support the planetary gears in two manners. In this embodiment, a first manner is used, where as shown in FIG. 1, the planetary gear is a shaft and the planet carrier 3 is a bearing, If the second manner is used, as shown in FIG. 2, the planetary gear is a bearing and the planet carrier is a shaft. The two manners for the planet carrier 3 to support the planetary gears have the same operating effects.

The teeth number combination in this embodiment makes the value of the range specifying parameter be 152/153, which is approximately equal to 0.9934640523. The requirement of the range specifying parameter is met.

The teeth number combination in this embodiment is as follows: the number of teeth of the left ring gear is 68, the number of teeth of the right ring gear is 64, the number of teeth of the left planetary gear is 19, and the number of teeth of the right planetary gear is 18; and the number K of gear sets is set to 4, which meets the principle of matching the teeth number combination with the number of gear sets. The number of gear sets is not large, and will avoid collisions between neighboring planetary gears.

In this embodiment, a rule for manufacturing and assembling planetary gears is executed. In this embodiment, the remainder value is 0. During manufacturing of planetary gears, an equiphase surface is selected on a first planetary gear so that the equiphase angle value is 0; an equiphase surface is selected on a second planetary gear so that the equiphase angle value is 0, an equiphase surface is selected on a third planetary gear so that the equiphase angle value is 0; an equiphase surface is selected on a fourth planetary gear so that the equiphase angle value is 0. During assembly of planetary gears, the two ring gears and the planet carrier 3 are assembled in place on the revolution axis, each mounting surface is calibrated, the equiphase surface of the first planetary gear with the equiphase angle value being 0 is caused to coincide with a first mounting surface, left and right equiphase points are caused to be outside the reference center distance, the first planetary gear is assembled; the equiphase surface of the second planetary gear with the equiphase angle value being 0 is caused to coincide with a second mounting surface, left and right equiphase points are caused to be outside the reference center distance, the second planetary gear is assembled; the equiphase surface of the third planetary gear with the equiphase angle value being 0 is caused to coincide with a third mounting surface, left and right equiphase points are caused to be outside the reference center distance, the third planetary gear is assembled; the equiphase surface of the fourth planetary gear with the equiphase angle value being 0 is caused to coincide with a fourth mounting surface, left and right equiphase points are caused to be outside the reference center distance, and the fourth planetary gear is assembled.

Assuming that the reference center distance in this embodiment is 40 mm, the reference circle radius of the left ring gear is 55.51020408 mm, the reference circle radius of the left planetary gear is 15.51020408 mm, the reference circle radius of the right ring gear is 55.65217391 mm, and the reference circle radius of the right planetary gear is 15.65217391 mm. This meets the regulation on gear reference circle radii.

In this embodiment, the speed reducer is formed by the first connection method, where the planetary carrier 3 is connected to the input end 6, the left ring gear 1 is connected to the output end 7, the right ring gear 2 is connected to the locking end 8, and taking a transmission ratio of transmission from the planet carrier 3 to the left ring gear 1 as a left transmission ratio, the left transmission ratio=1/(1−the number of teeth of the right ring gear*the number of teeth of the left planetary gear/(the number of teeth of the left ring gear*the number of teeth of the right planetary gear))=153. The input end 6 is connected with a power apparatus to input power. The output end 7 is connected with a power consumption apparatus to output power. The locking end 8 is connected with a reducer housing, and the rotation speed of the locking end 8 is zero. The auxiliary devices such as the bearings adopt mature technologies in the machinery industry, and the supporting function of the bearing needs to meet the requirements of this embodiment.

During operation of the speed reducer in this embodiment, the movement relationship is that the rotation direction of the planet carrier 3 is the same as the rotation direction of the left ring gear 1.

A transmission ratio value of about 150 is a commonly used transmission ratio value of a robot joint speed reducer. The existing robot joint speed reducer is mainly one of cycloidal pin gear reducers, that is, an RV reducer. The RV reducer can achieve a similar transmission ratio value, but its structure is complex and costly. The speed reducer of this embodiment has a simple structure and low costs, and can replace the RV reducer.

Figure 3:
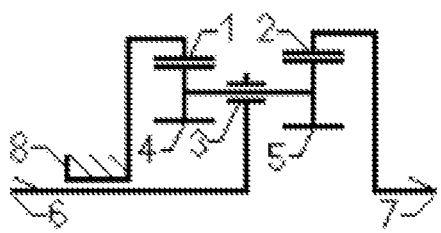
FIG. 3 is a schematic structural diagram of a balanced speed reducer of a dual-ring gear variable-line-speed planetary row of the present invention in which the right ring gear is connected to the output end and the planet carrier is a bearing.
Figure 4:
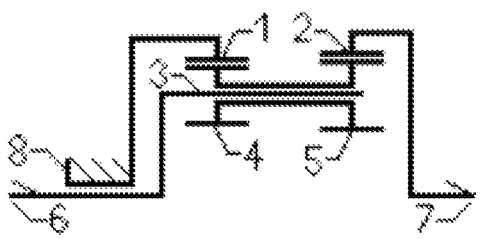
FIG. 4 is a schematic structural diagram of a balanced speed reducer of a dual-ring gear variable-line-speed planetary row of the present invention in which the right ring gear is connected to the output end and the planet carrier is a shaft.

If the speed reducer is formed by the second connection method, the planet carrier 3 supports the planetary gears in the first manner, as shown in FIG. 3. If the speed reducer is formed by the second connection method, the planet carrier 3 supports the planetary gears in the second manner, as shown in FIG. 4. The two manners for the planet carrier 3 to support the planetary gears have the same operating effects. The planetary carrier 3 is connected to the input end 6, the right ring gear 2 is connected to the output end 7, the left ring gear 1 is connected to the locking end 8, and taking a transmission ratio of transmission from the planet carrier 3 to the right ring gear 2 as a right transmission ratio, the right transmission ratio=1/(1−the number of teeth of the left ring gear*the number of teeth of the right planetary gear/(the number of teeth of the right ring gear*the number of teeth of the left planetary gear))=−152. The value of the transmission ratio is negative, and the rotation direction of the planet carrier 3 is opposite to the rotation direction of the right ring gear 2.

The basic principles, main features and advantages of the present invention have been shown and described above. Those skilled in the art should understand that the present invention is not limited to the above-mentioned embodiments. The descriptions of the embodiments and the specification are only for illustrating the principles of the present invention. Various changes and improvements may be made to the present invention without departing from the spirit and scope of the present invention. and such changes and improvements all fall within the scope of protection claimed by the present invention. The scope of protection claimed by the present invention is defined by the appended claims and equivalents thereof.

What is claimed is:

1. A balanced speed reducer of a dual-ring gear variable-line-speed planetary row, comprising a dual-ring gear variable-line-speed planetary row, an input end, an output end, a locking end and a bearing auxiliary device, characterized in that, the dual-ring gear variable-line-speed planetary row comprises a left ring gear, a right ring gear and a planet carrier with planetary gears, the planet carrier supports the planetary gears, and distances from planetary gear axes to a revolution axis, which are reference center distances, are equal; on a gear axis of each planetary gear, two gears, namely, a left planetary gear and a right planetary gear, are arranged in sequence;

each set of a number of teeth of the left ring gear, a number of teeth of the right ring gear, a number of teeth of the left planetary gear, and a number of teeth of the right planetary gear is a teeth number combination; the number of teeth of the right ring gear*the number of teeth of the left planetary gear/(the number of teeth of the left ring gear*the number of teeth of the right planetary gear) is a range specifying parameter; the number of planetary gear axes supported by the planet carrier is the number K of gear sets;

for the range specifying parameter, each teeth number combination makes a value of the range specifying parameter be greater than 0.875, less than 1.142857, and not equal to 1.0; the number K of gear sets is an integer not less than two, and when the teeth number combination and the number of gear sets are set, a principle of matching the teeth number combination with the number of gear sets is:

(1) when an absolute value of a difference between the number of teeth of the left ring gear and the number of teeth of the right ring gear is a multiple of 2, setting the number of gear sets to 2;

(2) when an absolute value of a difference between the number of teeth of the left ring gear and the number of teeth of the right ring gear is a multiple of 3, setting the number of gear sets to 3;

(3) when an absolute value of a difference between the number of teeth of the left ring gear and the number of teeth of the right ring gear is a multiple of 4, setting the number of gear sets to 4 or 2;
(4) when an absolute value of a difference between the number of teeth of the left ring gear and the number of teeth of the right ring gear is a multiple of 5, setting the number of gear sets to 5;
(5) when an absolute value of a difference between the number of teeth of the left ring gear and the number of teeth of the right ring gear is a multiple of 6, setting the number of gear sets to 6, 3 or 2;
(6) when an absolute value of a difference between the number of teeth of the left ring gear and the number of teeth of the right ring gear is a multiple of 8, setting the number of gear sets to 8, 4 or 2;
(7) when an absolute value of a difference between the number of teeth of the left ring gear and the number of teeth of the right ring gear is a multiple of 10, setting the number of gear sets to 5 or 2; the number of gear sets cannot be too large so as to avoid collisions between neighboring planetary gears;

a rule for manufacturing and assembling planetary gears is: dividing the number of teeth of the left ring gear by the number K of gear sets to obtain a remainder, wherein a value of the remainder ranges from O to (K−1) and is an integer; during manufacturing of planetary gears, selecting an equiphase surface on a first planetary gear so that an equiphase angle value is a, selecting an equiphase surface on a second planetary gear so that the equiphase angle value is (a+1*2n*remainder value/K), selecting an equiphase surface on a third planetary gear so that the equiphase angle value is (a+2*2n*remainder value/K), sequentially manufacturing a fourth planetary gear, a fifth planetary gear, a sixth planetary gear, a seventh planetary gear and so on by analogy, and selecting an equiphase surface on a Kth planetary gear so that the equiphase angle value is (a+(K−1)*2n*remainder value/K); during assembly of planetary gears, the two ring gears and the planet carrier are assembled in place on the revolution axis, each mounting surface is calibrated, the equiphase surface of the first planetary gear with the equiphase angle value being a is caused to coincide with a first mounting surface, left and right equiphase points are caused to be outside the reference center distance, the first planetary gear is assembled, the equiphase surface of the second planetary gear with the equiphase angle value being (a+1*2n*remainder value/K) is caused to coincide with a second mounting surface, left and right equiphase points are caused to be outside the reference center distance, the second planetary gear is assembled, the equiphase surface of the third planetary gear with the equiphase angle value being (a+2*2n*remainder value/K) is caused to coincide with a third mounting surface, left and right equiphase points are caused to be outside the reference center distance, the third planetary gear is assembled, the fourth planetary gear, the fifth planetary gear, the sixth planetary gear, the seventh planetary gear and so on are assembled by analogy, the equiphase surface of the Kth planetary gear with the equiphase angle value being (a+(K−1)*2n*remainder value/K) is caused to coincide with a Kth mounting surface, left and right equiphase points are caused to be outside the reference center distance, and the Kth planetary gear is assembled;

gear reference circle radii are: setting a reference circle radius of the left ring gear and a reference circle radius of the left planetary gear around the reference center distance, so that the number of teeth of the left ring gear I the number of teeth of the left planetary gear=the reference circle radius of the left ring gear/the reference circle radius of the left planetary gear, and that the reference circle radius of the left ring gear=the reference circle radius of the left planetary gear+the reference center distance, and setting a reference circle radius of the right ring gear and a reference circle radius of the right planetary gear around the reference center distance, so that the number of teeth of the right ring gear/the number of teeth of the right planetary gear=the reference circle radius of the right ring gear/the reference circle radius of the right planetary gear, and that the reference circle radius of the right ring gear=the reference circle radius of the right planetary gear+the reference center distance.

2. The balanced speed reducer of a dual-ring gear variable-line-speed planetary row according to claim 1, characterized in that, there are two connection methods for connecting the three components of the dual-ring gear variable-line-speed planetary row with the input end, the output end and the locking end, and speed reducers formed by the connection methods have different transmission ratios, wherein specifically,
in a first connection method, the planet carrier is connected to the input end, the left ring gear is connected to the output end, the right ring gear is connected to the locking end, and taking a transmission ratio of transmission from the planet carrier to the left ring gear as a left transmission ratio, the left transmission ratio=1/(1−the number of teeth of the right ring gear*the number of teeth of the left planetary gear/(the number of teeth of the left ring gear*the number of teeth of the right planetary gear));
in a second connection method, the planet carrier is connected to the input end, the right ring gear is connected to the output end, the left ring gear is connected to the locking end, and taking a transmission ratio of transmission from the planet carrier to the right ring gear as a right transmission ratio, the right transmission ratio=1/(1−the number of teeth of the left ring gear*the number of teeth of the right planetary gear/(the number of teeth of the right ring gear*the number of teeth of the left planetary gear)).

* * * * *